(12) United States Patent
Garrison et al.

(10) Patent No.: US 10,737,712 B2
(45) Date of Patent: Aug. 11, 2020

(54) FOLDING WHEELED CART

(71) Applicant: Rio Brands, LLC, W. Conshohocken, PA (US)

(72) Inventors: Scott Garrison, Fitchburg, WI (US); Xiang Shan Zhang, Suzhou (CN)

(73) Assignee: Rio Brands, LLC, Watertown, CT (US)

(*) Notice: Subject to any disclaimer, the term of this patent is extended or adjusted under 35 U.S.C. 154(b) by 0 days.

(21) Appl. No.: 16/393,871

(22) Filed: Apr. 24, 2019

(65) Prior Publication Data
US 2019/0337547 A1 Nov. 7, 2019

Related U.S. Application Data

(60) Provisional application No. 62/666,796, filed on May 4, 2018.

(51) Int. Cl.
*B62B 3/02* (2006.01)
*B62B 3/00* (2006.01)

(52) U.S. Cl.
CPC .............. *B62B 3/022* (2013.01); *B62B 3/005* (2013.01); *B62B 3/027* (2013.01); *B62B 2205/06* (2013.01)

(58) Field of Classification Search
CPC ..... B62B 3/022; B62B 3/005; B62B 2205/06; B62B 3/027
See application file for complete search history.

(56) References Cited

U.S. PATENT DOCUMENTS

| 3,479,052 A * | 11/1969 | Spielman ................ B62B 1/262 |
| | | 280/645 |
| 3,627,342 A | 12/1971 | Morellet |
| 3,677,571 A | 7/1972 | Maturo, Jr. et al. |
| 3,693,993 A | 9/1972 | Mazzarelli et al. |
| 3,804,432 A | 4/1974 | Lehrman |
| 4,199,171 A | 4/1980 | Betts |
| 4,222,585 A | 9/1980 | Crothers |
| 4,266,807 A | 5/1981 | Griffin |
| 4,429,897 A | 2/1984 | Friedman et al. |
| 4,513,989 A * | 4/1985 | Czajkowski ........... B62B 1/042 |
| | | 280/42 |

(Continued)

FOREIGN PATENT DOCUMENTS

| DE | 9012414 | 11/1990 |
| DE | 9317343 | 3/1994 |
| WO | WO 2012032440 | 3/2012 |

*Primary Examiner* — John D Walters
*Assistant Examiner* — James J Triggs
(74) *Attorney, Agent, or Firm* — Carmody Torrance Sandak & Hennessey LLP

(57) ABSTRACT

A collapsible cart assembly having a framework with two brackets. The two brackets have first arms, second arms and third arms. A rear leg frame section is rigidly affixed to the first arms. A front leg frame section that is pivotably connected to the second arms. A handle frame section is pivotably connected to the third arms of the brackets. Slides are disposed on the rear leg frame section. A first set of linkages connect the slides to the front leg frame section. A second set of linkages connect the slides to the handle frame section. The slides and linkages move the front leg frame the handle frame between an open configuration and a closed configuration.

19 Claims, 6 Drawing Sheets

(56) References Cited

U.S. PATENT DOCUMENTS

| | | | | |
|---|---|---|---|---|
| 4,531,752 A | * | 7/1985 | Diener | B62B 1/10 211/189 |
| 4,645,262 A | | 2/1987 | Furubotten | |
| 4,703,944 A | | 11/1987 | Higson | |
| 4,790,559 A | | 12/1988 | Edmonds | |
| 4,865,346 A | | 9/1989 | Carlile | |
| 4,887,837 A | | 12/1989 | Bonewicz, Jr. et al. | |
| 5,197,754 A | | 3/1993 | Ward | |
| 5,265,892 A | * | 11/1993 | Said | B62B 1/208 280/10 |
| 5,915,722 A | | 6/1999 | Thrasher et al. | |
| 5,988,671 A | | 11/1999 | Abelbeck et al. | |
| 6,598,898 B2 | | 7/2003 | Chu | |
| 6,837,502 B1 | | 1/2005 | Lee | |
| 8,162,349 B1 | | 4/2012 | Roselle | |
| 8,381,662 B2 | | 2/2013 | Goldszer | |
| 8,439,374 B1 | | 5/2013 | Elden | |
| 8,511,406 B2 | | 8/2013 | Anasiewicz | |
| 8,596,389 B2 | | 12/2013 | Anasiewicz | |
| 8,608,188 B2 | | 12/2013 | Goldszer | |
| 8,851,504 B1 | | 10/2014 | Goldszer | |
| 8,882,135 B1 | | 11/2014 | Chen | |
| 9,061,695 B1 | | 6/2015 | Mann | |
| 9,173,495 B2 | | 11/2015 | Goldszer | |
| 9,371,083 B1 | | 6/2016 | Jones et al. | |
| D784,116 S | | 4/2017 | Goldszer | |
| 2003/0137131 A1 | | 7/2003 | Strange | |
| 2005/0103950 A1 | * | 5/2005 | Joubert | B62B 1/12 248/98 |
| 2006/0049614 A1 | | 3/2006 | Shamah | |
| 2008/0061524 A1 | | 3/2008 | Goldszer | |
| 2008/0296855 A1 | | 12/2008 | Roseman | |
| 2009/0212535 A1 | * | 8/2009 | Darling, III | A61G 1/013 280/651 |
| 2012/0013104 A1 | | 1/2012 | Geva et al. | |
| 2012/0205884 A1 | | 8/2012 | Craven et al. | |

* cited by examiner

FOLDING WHEELED CART

RELATED APPLICATIONS

This application claims the benefit of U.S. Provisional Application No. 62/666,796, file May 4, 2018.

BACKGROUND OF THE INVENTION

1. Field of the Invention

In general, the present invention relates to wheeled carts that have collapsible frames. More particularly, the present invention relates to mechanisms that cause the frames of wheeled carts to either collapse or deploy.

2. Prior Art Description

When individuals travel to a beach, they typically bring chairs, food, beverages, towels, sunscreen and a wide selection of secondary objects, such as umbrellas, shovels and the like. However, it is often not possible to park a vehicle very close to a beach. As a result, the individuals must carry the objects to the beach from a vehicle, hotel or home. This can be very difficult and can be nearly impossible for elderly persons or persons with disabilities.

Recognizing the problem, various manufacturers have produced carts that are designed to hold various objects and equipment as they are transported over sand or other loose soil. In this manner, all the gear needed for the beach can be loaded onto the cart and the cart can then be readily pushed or pulled onto the beach. Many such beach carts are made to be collapsible. In this manner, the beach cart can be collapsed into a compact size when carried in a vehicle or stored at home. Such collapsible beach carts are exemplified by U.S. Pat. No. 5,988,671 to Abelbeck, which is owned by the Applicant and which is widely sold under the trade name Wonder Wheeler®.

A problem associated with collapsible beach carts is that they typically require a person to use two hands to open and/or close the beach cart. However, when trying to hold the various items that are to be placed on the beach cart, two free hands are rarely available. Furthermore, most prior art beach carts utilize locking linkage arms to hold the cart open. These locking linkage arms are typically made of metal and contain rivet hinge connections between the linkage arms. Such linkage arms must be manually manipulated by a hand or foot in order to collapse the beach cart. Such manipulations are difficult to perform, especially if the linkages are sandy or if the linkages are corroded after a long period of non-use. The result is that many beach carts fail to be locked open as they are being deployed. The beach cart may appear to be fully open, but may collapse after being loaded with equipment or being forcefully pushed and pulled across sand.

A need therefore exists for an improved beach cart assembly that is capable of being opened and closed with one hand. A need also exists for a collapsible beach art that readily locks into an open configuration and does not appear open unless locked open. These needs are met by the present invention as described and claimed below.

SUMMARY OF THE INVENTION

The present invention is a collapsible cart assembly that can be selectively configured between an open configuration and a collapsed configuration. The cart assembly includes flexible baskets and panels that are supported in a collapsible framework. The collapsible framework includes a mirrored set of brackets that are positioned on opposite sides of the cart assembly. The brackets hold four frame sections together. The first frame section is a rear leg section. The rear leg section has a first set of frame elements that connect to the set of brackets. The second frame section is a front leg section. The front leg section has a second set of frame elements that are pivotably connected to the set of brackets. The third frame section is the handle section. The handle section has a third set of frame elements that are pivotably connected to the set of brackets. The fourth frame section is the basket support section. The basket support section has a fourth set of frame elements that that are pivotably connected to the set of brackets.

Slides are disposed on the first set of frame elements. The slides can reciprocally move along the first set of frame elements between a first position and a second position. Linkages are provided that connect the slides the front leg section, the handle section, and the basket support section.

A locking mechanism is provided that selectively locks at least one of the slides into its first position along the first set of frame elements. A release cable extends from the locking mechanism to the handle section. The release cable releases the locking mechanism when pulled in tension. A manually operable cable tensioner is disposed on the handle section that pulls the cable in tension and releases the locking mechanism, therein enabling the slides to move along the first set of frame elements. The movement of the slides causes the linkages to move the various frame sections and configure the cart assembly into either an open configuration or a folded configuration.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention folding cart can be configured in many ways and can be adapted for use in many applications. The folding cart carries a basket structure made of cloth, mesh or other flexible material. The basket structure can have numerous configurations depending upon market needs. For example, the basket structure can be configured to carry equipment commonly used at the beach. Otherwise, the basket structure can be configured as a grocery bag carrier or even a baby stroller. The configuration of the basket structure is the design choice of the manufacturer. As such, only one exemplary embodiment showing an example basket structure is illustrated and described. The exemplary embodiment illustrated sets forth one of the best modes contemplated for the invention. The illustrated embodiment, however, is merely exemplary and should not be considered a limitation when interpreting the scope of the appended claims.

Figure 1:
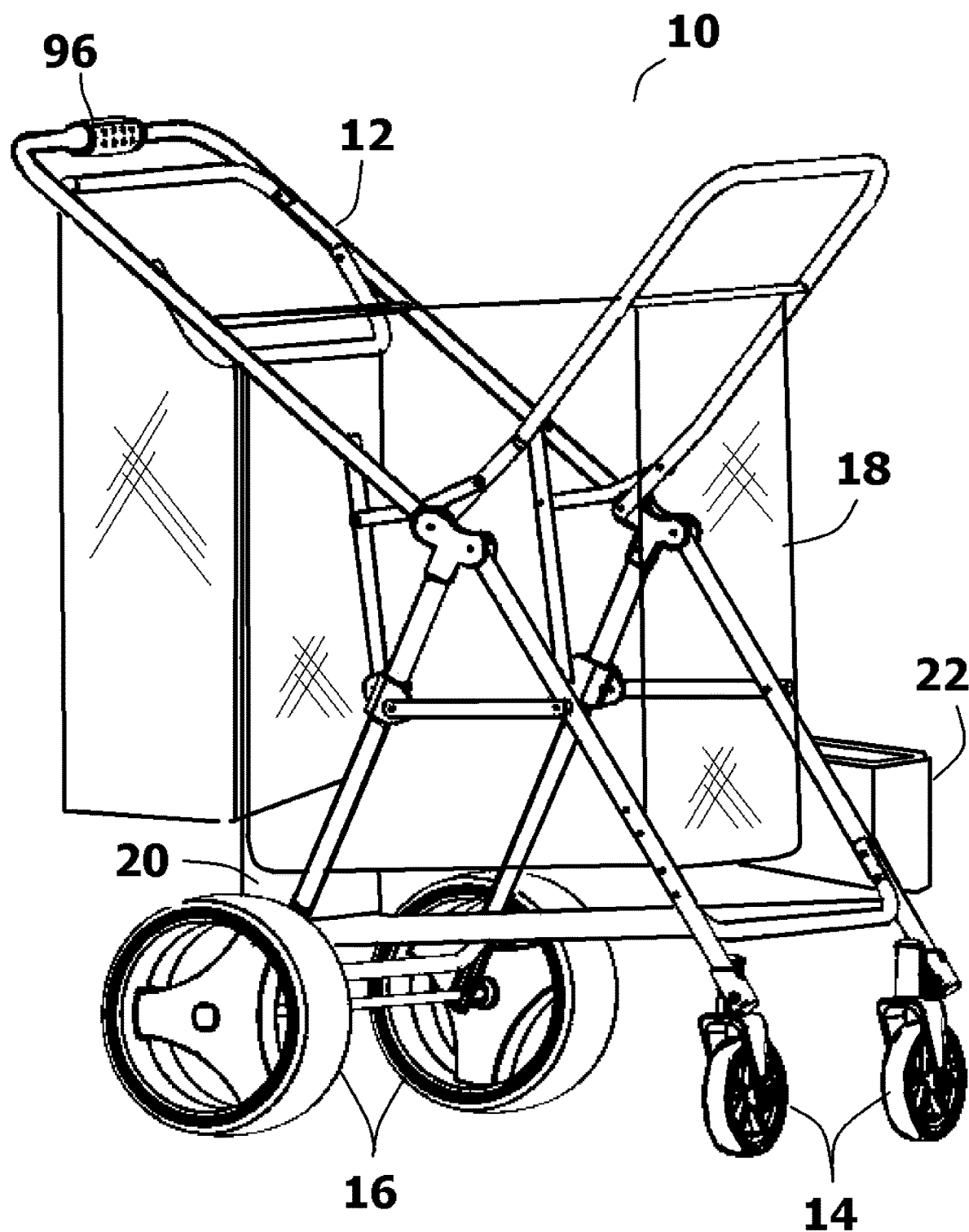
FIG. 1 is a perspective view of a folding cart in its open configuration.

Referring to FIG. 1, a cart assembly 10 is shown in its fully open configuration. The cart assembly 10 has a framework 12 that is supported on wheels 14, 16. The framework 12, in turn, supports at least one basket 18 and a flexible support panel 20. The basket 18 and the support panel 20 readily fold when the framework 12 is collapsed. When the framework 12 is fully open, as shown, the basket 18 and support panel 20 become fully extended by their connections to the framework 12.

Secondary support structures 22, such as a wave board holder and/or an umbrella holder, can also be affixed to the framework 20 in convenient locations. The types of secondary support structures 22 provided depend upon the intended use of the overall cart assembly 10.

Figure 2:
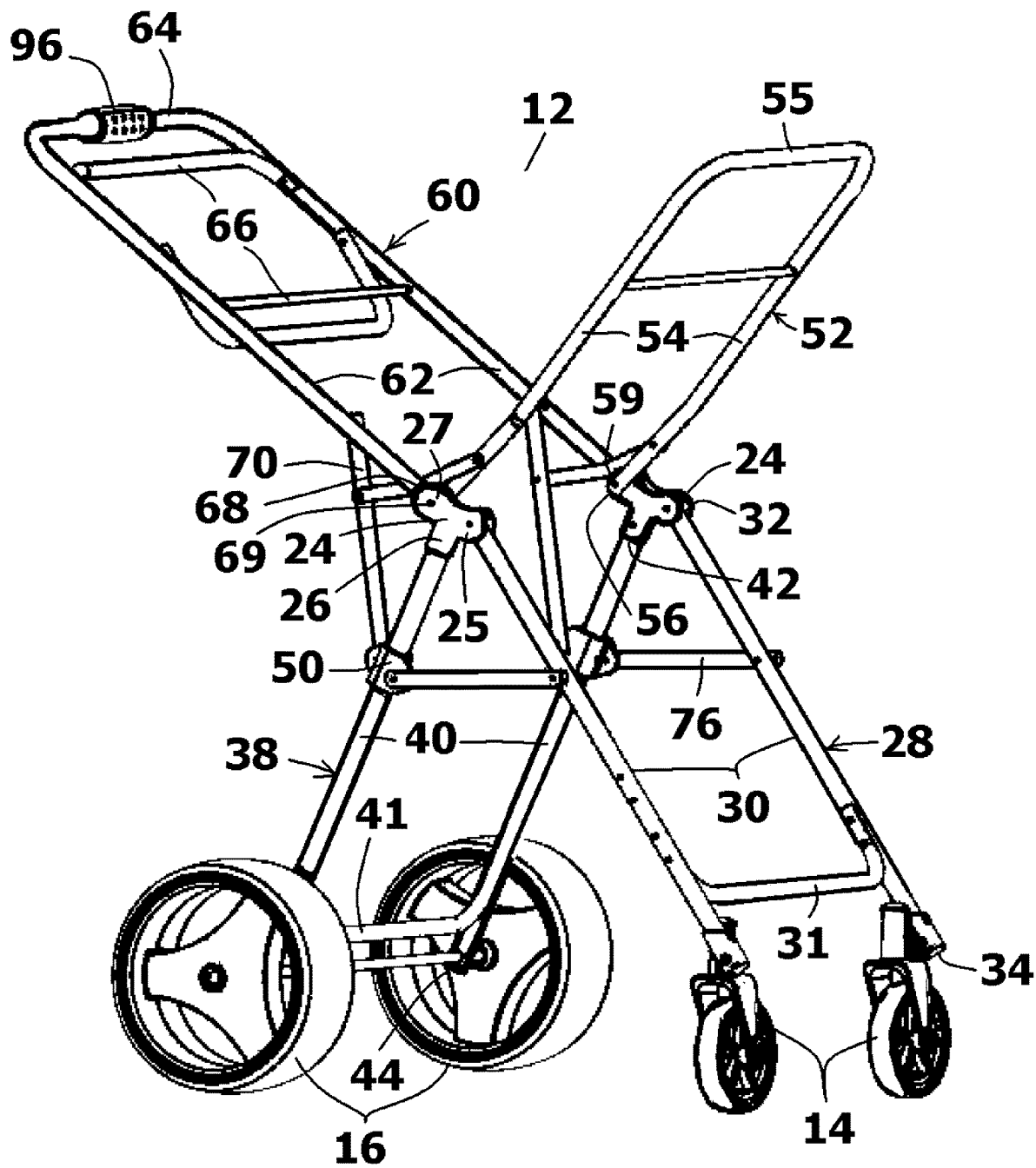
FIG. 2 is a side view of the embodiment of FIG. 1.
Figure 3:
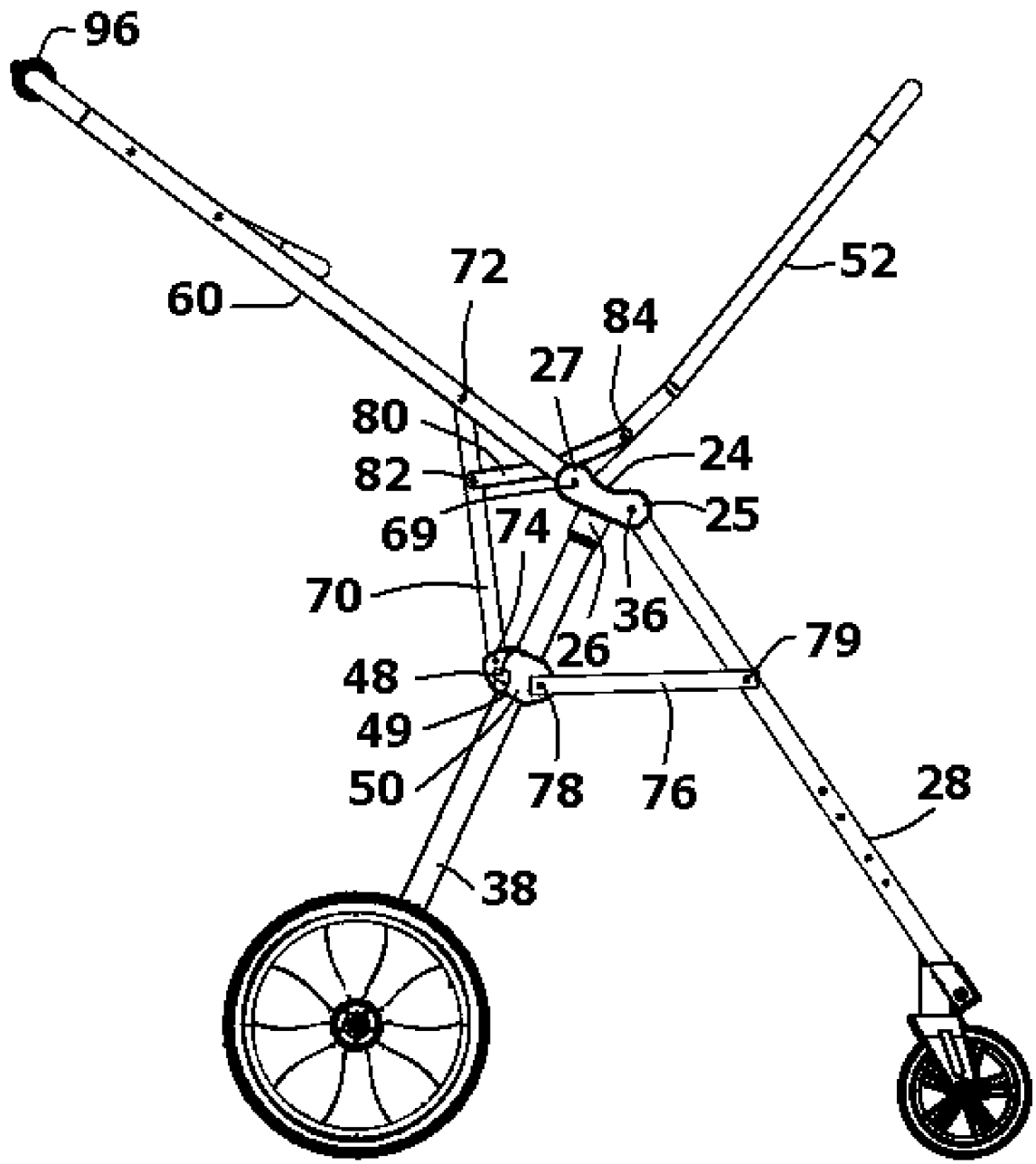
FIG. 3 is a side view showing the folding cart in a partially folded configuration.
Figure 4:
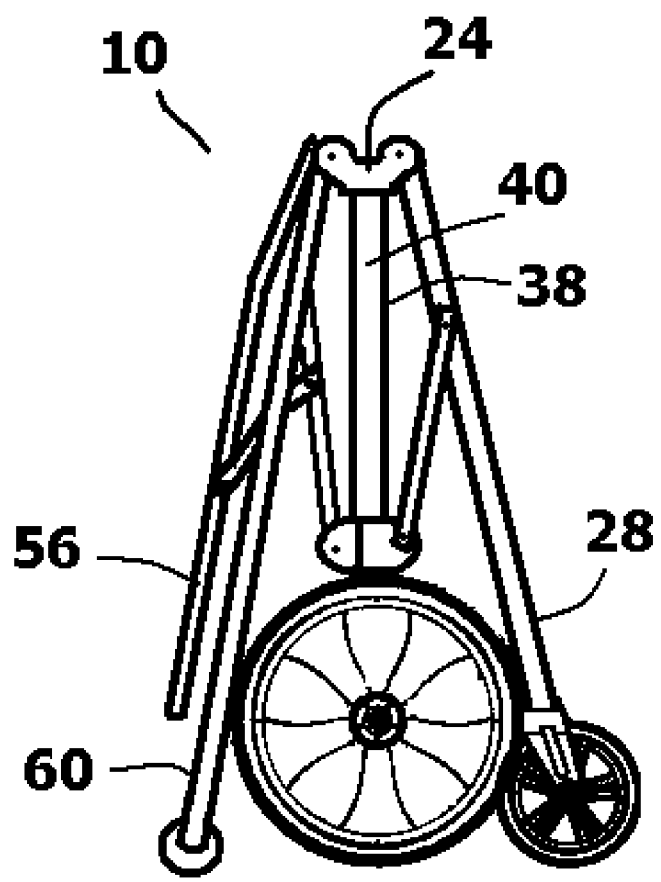
FIG. 4 is a side view of the folding cart in a fully folded configuration.

Referring to FIG. 2, FIG. 3 and FIG. 4, the framework 12 of the cart assembly 10 is shown without the basket 18, support panel 20 and secondary support structures 22 previously shown in FIG. 1. In this manner, the form and function of the framework 12 can be more clearly explained. The framework 12 has two generally T-shaped brackets 24 positioned on opposite sides of the cart assembly 10. Each T-shaped bracket 24 has three arms 25, 26, 27. The T-shaped brackets 24 are used to interconnect four distinct sections of framing that create the overall framework 12. Each section of framing has two parallel frame elements that are joined by one or more cross bars in either an H-shaped pattern or a U-shaped pattern.

The first frame section is the front leg section 28. The front leg section 28 has two parallel side frame elements 30, joined by a crossbar 31. Each of the side frame element elements 30 has a first end 32 and an opposite second end 34. Front wheels 14 are provided. The front wheels 14 attach to the second ends 34 of the side frame elements 30. The front wheels 14 are preferably caster wheels. However, straight wheels can also be used.

The first ends 32 of the side frame elements 30 terminate at the first arms 25 of the T-shaped brackets 24. The side frame elements 30 each engage the first arms 25 of the T-shaped brackets 24 with pivot connections 36. The pivot connections 36 create joints that enable the front leg section 28 to rotate relative the T-shaped brackets 24.

The second frame section is the rear leg section 38. The rear leg section 38 has two side frame elements 40 joined by a crossbar 41. Each of the side frame elements 40 has a first end 42 and an opposite second end 44. Rear wheels 16 are provided. The rear wheels 16 attach to the second ends 44 of the side frame elements 40. The rear wheels 16 are preferably large wide wheels that can readily roll over sand and loose soil.

The first ends 42 of the side frame elements 40 terminate at the second arms 26 of the T-shaped brackets 24. The side frame elements 40 are rigidly affixed to the second arms 25 of the T-shaped brackets 24 at a set orientation. As such, the rear leg section 38 and the T-shaped brackets 24 move together as a single unit.

There is a spring biased detent pin 48 extending from each of the side frame elements 40. The detent pins 48 are biased into their protruding positions. The detent pins 48 are positioned approximately one-third down the length of the side frame elements 40, as measured from the T-shaped brackets 24. The detent pins 48 are selectively retractable in a manner that is later explained.

A pair of slides 50 are attached to the side frame elements 40 of the rear leg section 38. The slides 50 can move back and forth along the side frame elements 40 without disconnecting from the side frame elements 40. Each of the slides 50 contains a receptacle hole 49 that can receive one of the detent pins 48 as the slide pass over the detent pins 48. As a slide 50 passes over a detent pin 48, the slide 50 temporarily depresses the detent pin 48, therein enabling the slide 50 to continue over the detent pin 48. As the detent pin 48 passes into the receptacle hole 49, the detent pin 48 pops back into position and locks the slide 50 into place. The detent pins 48 can be selectively retracted to release the slides 50. The retraction mechanism for the detent pins 48 is later described.

The third frame section is the basket support section 52. The basket support section 52 has two side frame elements 54 joined by a crossbar 55. Each side frame element 54 has a first end 56 and an opposite second end 58. The first ends 56 of the side frame elements 54 terminate at the third arms 27 of the T-shaped brackets 24. The side frame elements 54 engage the third arms 27 of the T-shaped brackets 24 with pivot connections 59. The pivot connections 59 create joints that enable the basket support section 52 to rotate relative the T-shaped brackets 24.

The fourth frame section is the handle section 60. The handle section 60 has two side frame elements 62. joined by a push bar 64 and basket support bars 66. The push bar 64 can be unistructural with the two side frame elements 62 in an inverted U-shaped configuration. Each side frame element 62 has a free end 68 opposite the push bar 64. The free ends 68 of the side frame elements 62 also terminate at the third arms 27 of the T-shaped brackets 24. The side frame elements 62 engage the third arms 27 of the T-shaped brackets 24 with pivot connections 69. The pivot connections 69 create joints that enable the handle section 60 to rotate relative the T-shaped brackets 24.

A first set of linkages 70 connect the side frame elements 62 of the handle section 60 to the slides 50 on the rear leg section 38. The first set of linkages 70 are attached to both the side frame elements 62 and the slides 50 with pivot connections 72, 74. Likewise, a second set of linkages 76 connect the side frame elements 30 of the front leg section 28 to the slides 50 on the rear leg section 38. The second set of linkages 76 are attached to both the side frame elements 30 and the slides 50 with pivot connections 78, 79.

A third set of linkages 80 connects the side frame elements 54 of the basket support section 52 to the first set of linkages 70. The third set of linkages 80 are attached to both the side frame elements 54 and the first set of linkages 70 with pivot connections 82, 84.

Referring to FIG. 3 and FIG. 4 in conjunction with FIG. 2, it can be seen that as the slides 50 move down the side frame elements 40 of the rear leg section 38, the various linkages 70, 76, 80 cause the front leg section 28, the basket support section 52, and the handle section 60 of the framework 12 to rotate about the brackets and collapse toward the rear leg section 38. When in its fully folded configuration, the side frame elements 30, 40, 54, 62 that correspond to the front leg section 28, the rear leg section 38, the basket support section 52, and the handle section 60 are all within twenty degrees of being parallel. This significantly reduces the bulk of the cart assembly 10 and makes the cart assembly 10 highly portable.

Figure 5:
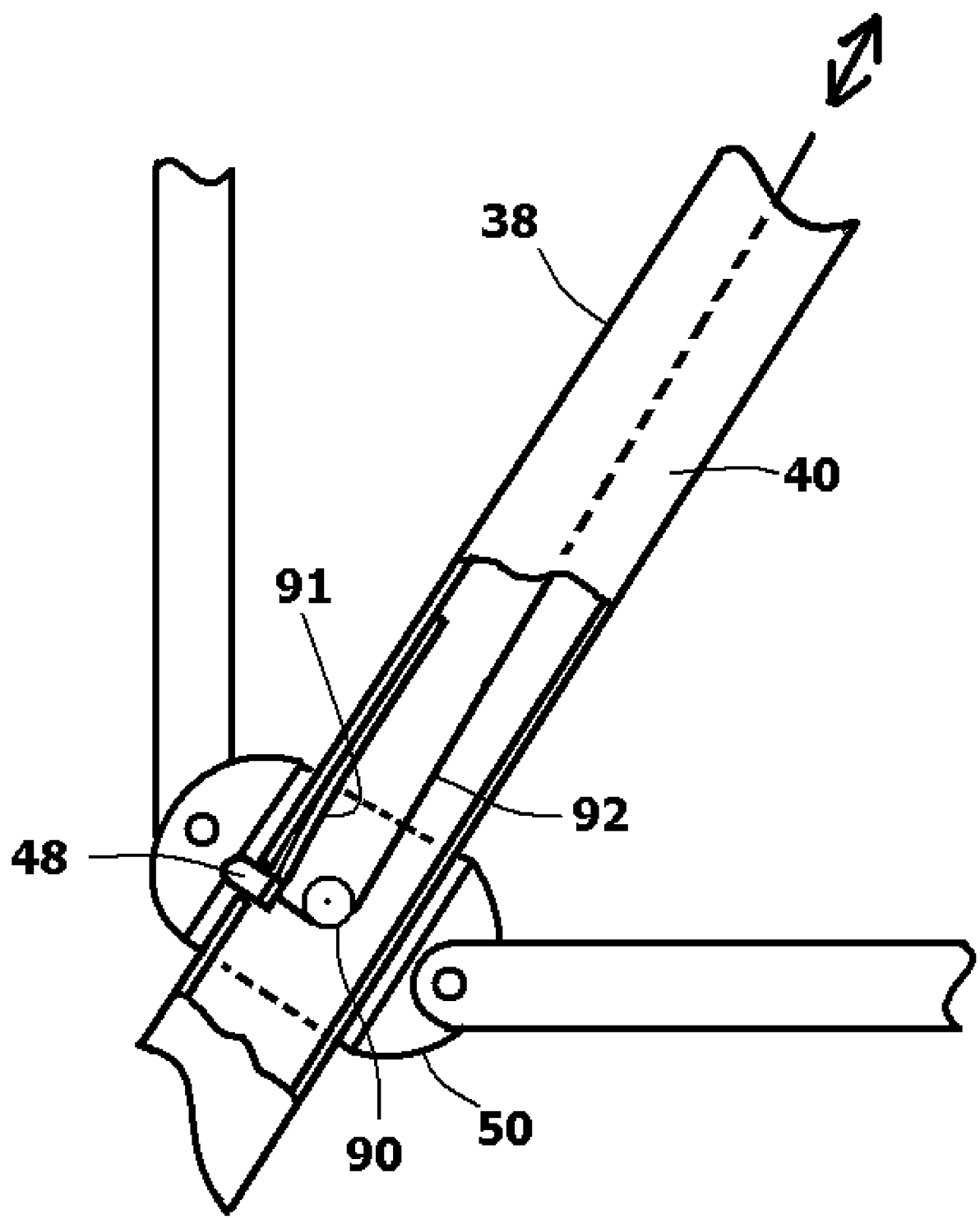
FIG. 5 is a fragmented view of the slide component of the folding cart.

Referring to FIG. 5, in conjunction with FIG. 1, FIG. 2, and FIG. 3, it will be understood that the slides 50 are selectively locked in place by the detent pins 48. Each detent pin 48 is part of a larger locking mechanism 90 disposed inside the side frame elements 40 of the rear leg section 38. The detent pins 48 are affixed to a leaf spring 91 or spring biased lever that biases the detent pins 48 through the receptacle holes 49 in the side frame elements 40. The leaf spring 91 is attached to a cable 92. The cable 92 is oriented using pulleys and/or guide posts 94 so that any tension in the cable 92 acts against the spring bias of the locking mechanism 90. Once enough tension is applied to the cable 92 to overcome the spring bias, the detent pin 48 retracts and disengages the slide 50.

Figure 6:
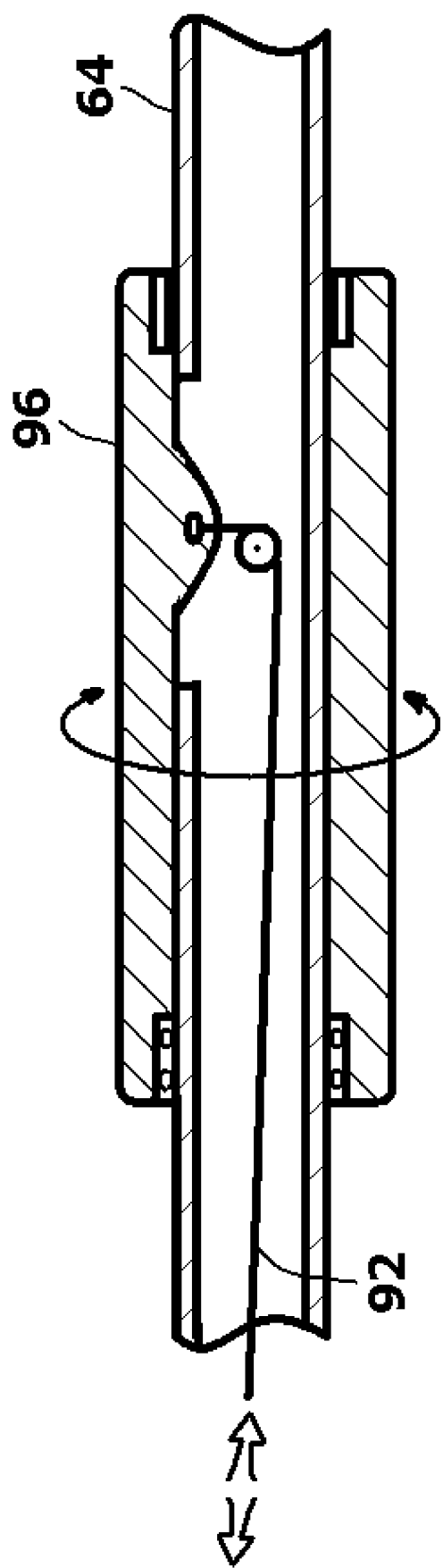
FIG. 6 is a fragmented view of the rotating grip of the folding cart.

The cable 92 runs through the rear leg section 38, through the T-shaped brackets 24 and into the handle section 60. Referring to FIG. 6 in conjunction with FIG. 1 and FIG. 5, it can be seen that a rotatable grip 96 is disposed on the push bar 64 of the handle section 60. The rotatable grip 96 is connected to the cable 92. The cable 92 passes through a guide or a pulley that reorients the cable 92 to be perpendicular to the rotational axis of the rotatable grip 96. The cable 92 is connected to the section of the rotatable grip 96 that rotates. In this manner, when the rotatable grip 96 is manually rotated, the rotational movement is converted into tension in the cable 92. The cable 92 becomes taut, therein causing the detent pin 48 to retract.

Referring to all figures, it will be understood that to collapse the folding cart assembly 10, the rotatable grip 96 is turned and the slides 50 on the rear leg section 38 are released. The slides 50 move toward the rear wheels 16. The slides 50 are affixed to the first set of linkages 70. The pull on the first set of linkages 70 by the moving slides 50 causes the handle section 60 to rotate down toward the rear leg section 38. The pull on the second set of linkages 76 by the moving slides 50 causes the front leg section 28 to rotate toward the rear leg section 38. Lastly, the movement of the first set of linkages 70 is translated to the connected third set of linkages 80. The pull on the third set of linkages 80 causes the basket support section 52 to rotate toward the rear leg section 38. The result is that all the frame sections to move toward the rear leg section 38.

To open the folded cart assembly 10, the handle section 60 is rotated away from the rear leg section 38. This movement translates to all other sections of the cart assembly 10. The slides 50 move up the side frame elements 48 of the rear leg section 38 and the previously described collapsing processes is reversed. When the handle section 60 is rotated to its operating position, the slides 50 lock in place and the assembly is ready for use.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A collapsible cart assembly selectively configurable between an open configuration and a folded configuration, said cart assembly comprising:
    a set of brackets,
    a rear leg section having a first set of frame elements that connect to said set of brackets;
    a front leg section having a second set of frame elements that are pivotably connected to said set of brackets;
    a handle section having a third set of frame elements that are pivotably connected to said set of brackets;
    slides disposed on said first set of frame elements, wherein said slides are reciprocally movable along said first set of frame elements;
    linkages that connect said slides to said front leg section and said handle section;
    a locking mechanism that selectively locks at least one of said slides into a fixed position along said first set of frame elements;
    a release cable that extends from said locking mechanism to said handle section, wherein said release cable releases said locking mechanism when pulled in tension;
    a manually operable cable tensioner disposed on said handle section that pulls said cable in tension and releases said locking mechanism, therein enabling said slides to move along said first set of frame elements,
    wherein said slides cause said linkages to configure said cart assembly into said open configuration when said slides are engaged by said locking mechanism, and wherein said slides enable said cart assembly to fold into said folded configuration when not engaged by said locking mechanism.

2. The assembly according to claim 1, wherein said linkages include a first set of linkages that connect said slides to said handle section and a second set of linkages that connect said slides to said front leg section.

3. The assembly according to claim 2, further including a basket support section having a fourth set of frame elements that are pivotably connected to said set of brackets.

4. The assembly according to claim 3, further including a third set of linkages that are pivotably connected to said first set of linkages and join said fourth set of frame elements to said first set of linkages.

5. The assembly according to claim 1, wherein each of said brackets has three extending arms, wherein said first set of frame elements are rigidly affixed to a first of said arms, said second set of frame elements are pivotably connected to a second of said arms and said third set of frame elements are pivotably connected to a third of said arms.

6. The assembly according to claim 1, further including wheels, wherein said front leg section and said rear leg section are supported on said wheels.

7. The assembly according to claim 1, wherein said handle section includes a push bar that extends between said third set of frame elements, wherein said manually operable cable tensioner is disposed on said push bar.

8. The assembly according to claim 7, wherein said manually operable cable tensioner includes a rotatable grip.

9. The assembly according to claim 3, further including a basket supported on said cart assembly by said handle section and said basket support section.

10. A collapsible cart assembly selectively configurable between an open configuration and a folded configuration, said cart assembly comprising:
    two brackets having first arms, second arms and third arms;
    a rear leg frame section that is rigidly affixed to said first arms of said brackets;
    a front leg frame section that is pivotably connected to said second arms of said brackets;
    a handle frame section that is pivotably connected to said third arms of said brackets;
    slides disposed on said rear leg frame section, wherein said slides are reciprocally movable between a first position and a second position;
    a first set of linkages that connect said slides to said front leg frame section;
    a second set of linkages that connect said slides to said handle frame section;
    wherein said slides move said first set of linkages, said second set of linkages, said front leg frame and said handle frame into said open configuration when said slides move to said first position, and wherein said slides move said first set of linkages, said second set of linkages, said front leg frame and said handle frame into said collapsed configuration when said slides move to said second position.

11. The assembly according to claim 10, further including a locking mechanism that selectively locks at least one of said slides into said first position.

12. The assembly according to claim 11, further including a release cable that extends from said locking mechanism to said handle frame section, wherein said release cable releases said locking mechanism when pulled in tension.

13. The assembly according to claim 12, further including a manually operable cable tensioner disposed on said handle frame section that pulls said cable in tension and releases said locking mechanism, therein enabling said slides to move from said first position toward said second position.

14. The assembly according to claim 10, further including a basket support section pivotably connected to said third arms of said brackets.

15. The assembly according to claim 14, further including a third set of linkages that are pivotably connected to said first set of linkages and join said basket support section to said first set of linkages.

16. The assembly according to claim 10, further including wheels, wherein said front leg frame section and said rear leg frame section are supported on said wheels.

17. The assembly according to claim 13, wherein said handle frame section includes a push bar, wherein said manually operable cable tensioner is disposed on said push bar.

18. The assembly according to claim 17, wherein said manually operable cable tensioner includes a rotatable grip.

19. The assembly according to claim 13, further including a basket supported on said cart assembly by said handle frame section and said basket support section.

* * * * *